Nov. 24, 1942.   G. E. SELDON   2,303,235
OIL BURNER CONTROL
Filed May 4, 1940   3 Sheets-Sheet 1

INVENTOR
GEORGE E. SELDON
ATTORNEY

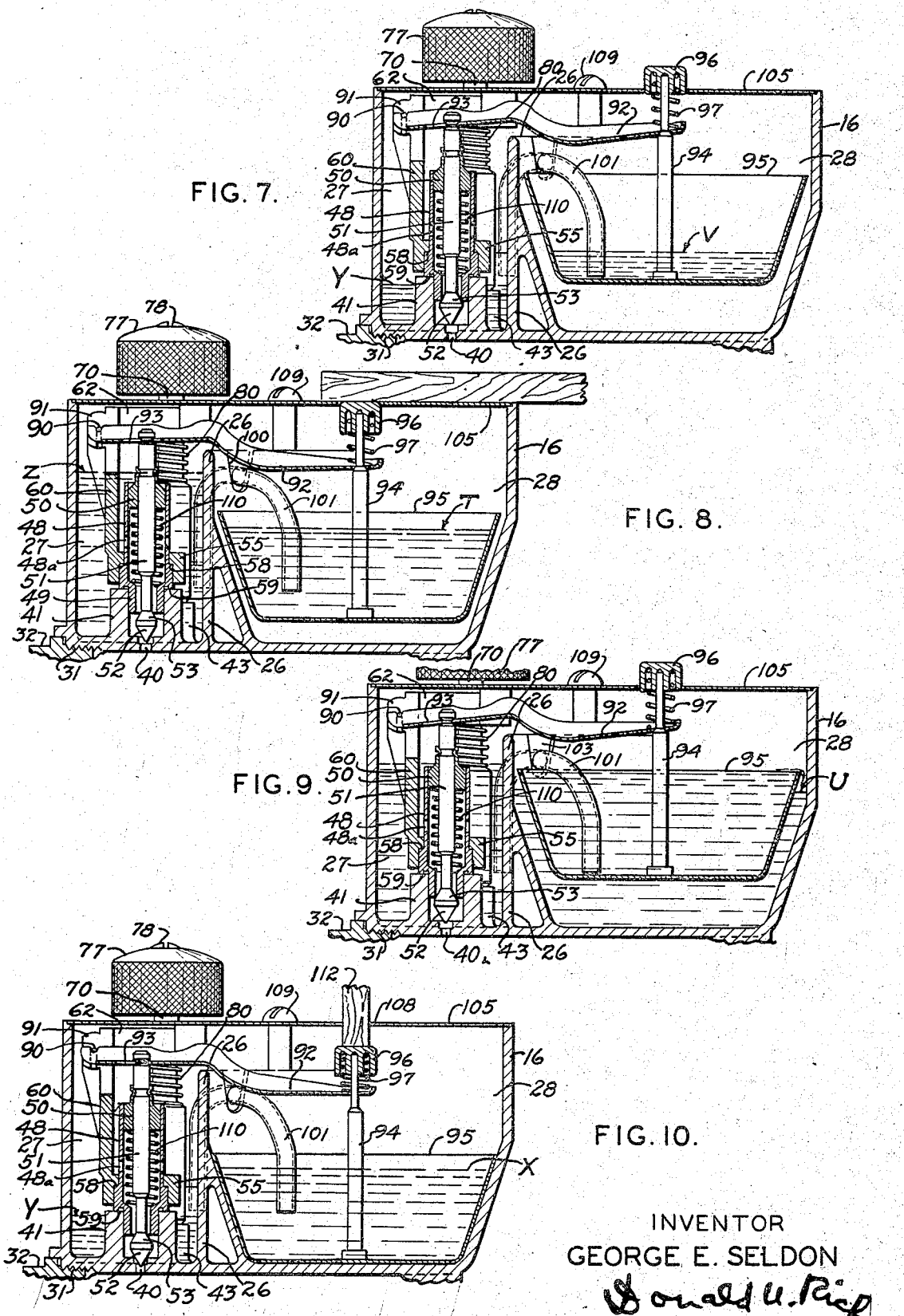

Patented Nov. 24, 1942

2,303,235

UNITED STATES PATENT OFFICE 2,303,235

OIL BURNER CONTROL

George E. Seldon, Brentwood, Mo., assignor to Carter Carburetor Corporation, St. Louis, Mo., a corporation of Delaware Application May 4, 1940, Serial No. 333,276

13 Claims. (Cl. 137—68)

This invention relates to liquid supply controls and consists particularly in a combination constant level and safety cut off device particularly adapted for use with fuel supply systems for oil burners.

Constant level and safety cut off devices for oil burners, as now known, are provided with a main constant level chamber controlled by a float and valve and an auxiliary float chamber or bucket responsive to overflow from the main chamber to cut off the inlet as, for instance, when the main inlet valve, valve seat, or actuating mechanism is fouled or does not operate properly for any reason. Usually the auxiliary float or bucket trips an over-center mechanism which thereupon punches the main inlet valve with a view to clearing the valve seat and insuring proper seating. In some cases, the overflow is ejected from the auxiliary chamber back into the main chamber by depressing the auxiliary float which fits rather snugly therein.

Such devices as now in general use are rather complicated, bulky, and expensive due to the duplicate floats and chambers and the snap action trip mechanism and are not wholly satisfactory since a single valve and seat are relied upon for cutting off the fuel supply under normal operating, as well as, abnormal conditions. Furthermore, there is no indication that the safety device has been tripped other than the extinguishment of the flame in the burner.

In the present invention a unitary, compact mechanism is utilized for closing the fuel feed passage when the normal liquid level is attained in the main constant level chamber and also in case of excessive level due to fouling of the main inlet valve. The safety cut off mechanism operates upon a separate valve and downwardly facing valve seat which is constantly washed by the fuel admitted to the main chamber so that this seat will be maintained free of sediment and foreign matter which may enter the valve chamber. In the safety cut off position, a part of the mechanism, normally located obscurely within the casing, is projected into a clearly visible position outside the casing and this part is also utilized for forcing the overflowed liquid from the auxiliary chamber.

In the accompanying drawings which illustrate the invention:

Figure 3:
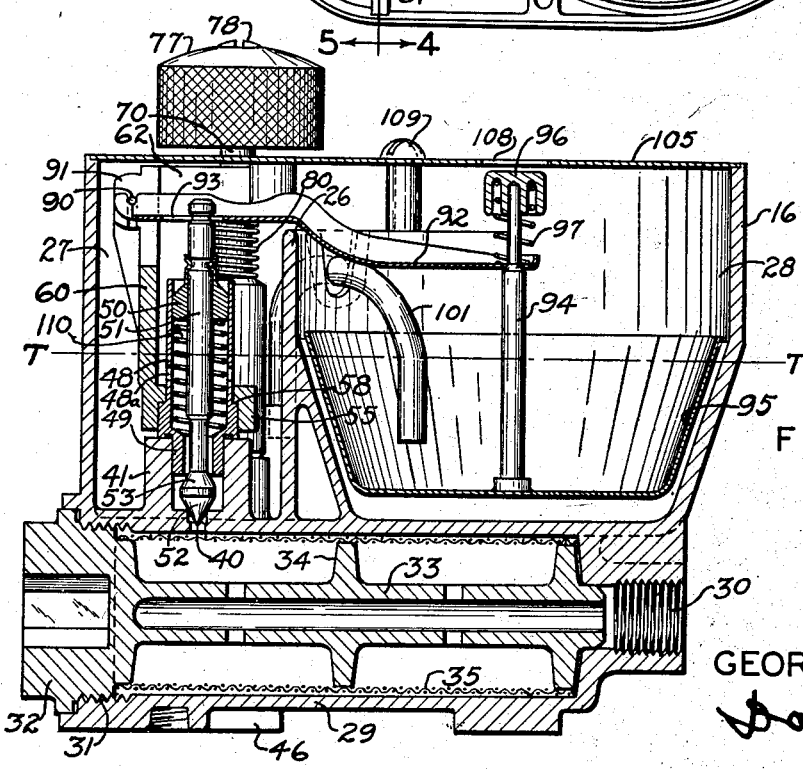
Fig. 3 is a vertical, longitudinal section taken substantially on line 3—3 of Fig. 2.

Figs. 7, 8, 9 and 10 are sectional views similar to Fig. 3, Fig. 7 showing the chambers and pan substantially emptied, Fig. 8 showing the pan manually lowered for starting the flow through the device, Fig. 9 showing the safety valve closed due to buoyancy of liquid overflowed from the pan into the auxiliary chamber, and Fig. 10 showing the pan manually depressed to force the overflow from the auxiliary chamber thereinto.

Figure 11:
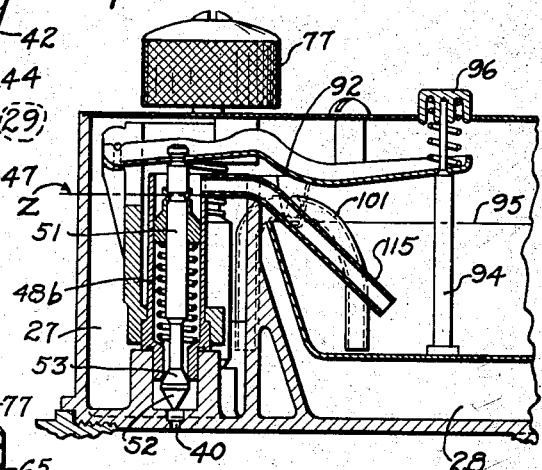

Fig. 11 is a sectional view similar to Figs. 7 and 8, but showing a modification.

Figure 1:
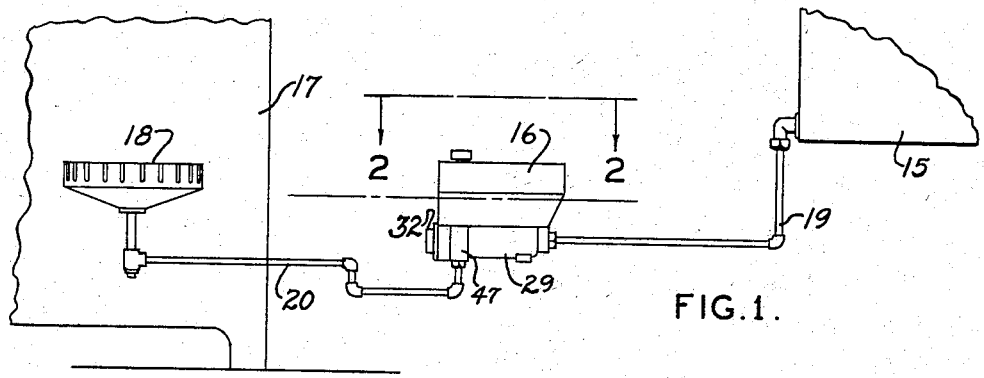
Fig. 1 is a diagrammatic view representing a fuel feed system for an oil burner.

The type of fuel feed system for which the present invention is particularly adapted, is illustrated diagrammatically in Fig. 1 and includes a gravity tank 15, the constant level and safety device having a casing 16, a furnace 17, a burner 18, and suitable connecting piping as at 19 and 20. Tank 15 is at a higher level than the control device so that liquid will be fed by gravity thereto and to burner 18 which is at the same level as the control device.

The control, as more clearly shown in the remaining figures, is housed within a generally oval casing 16 having a curved partition 26 extending thereacross and dividing the same into a main chamber 27 and a circular auxiliary chamber 28 having an inwardly tapered lower portion. Formed on the bottom of the casing is a horizontal, tubular structure 29 threaded at one end, as at 30, for attachment to the piping from the supply tank and also threaded at the other end as at 31 for receiving the threaded, closed end 32 of a perforated tube 33 having annular ribs or wings 34 supporting a cylindrical screen 35. The open end of tube 33 fits snugly within threaded aperture 30 so that all fuel fed through this aperture must enter the interior of screen 35.

An inlet port 40 is located in the center of the floor of main chamber 27 and is surrounded by an upwardly projecting apertured boss structure 41 forming a valve chamber. At the sides of boss 41 are other apertured bosses 42 and 43 forming outlet ports 44 and 45 the bosses being extended downwardly to form hollow ribs 46 and 47 on tubular structure 29. These ribs are threaded for attachment to piping, as at 20 in Fig. 1, leading to the burner. Where only one burner is connected to the device, one of ribs 46, 47 will be plugged. A tubular valve guide 48 has a reduced lower portion 49 pressed into apertured boss 41 and slidably receives a guide collar 50 rigidly secured to inlet valve stem 51 (Fig. 3). Sleeve 48 has openings 48a for admitting oil from the interior of the sleeve into main chamber 27. Stem 51, at its lower end, is enlarged to provide oppositely facing conical valves 52 and 53 disposed to seat, respectively, against the upper edge of inlet port 40 and the lower edge of reduced portion 49 of guide sleeve or tube 48. The inlet valve is constantly urged upwardly by a coiled spring 110.

Sleeve 48 is maintained in liquid tight seating engagement with boss 41 by means of clamping structure including a base portion 55 secured by bolts 56 (Figs. 2 and 5) to structure 41 adjacent the valve chamber therein. Base portion 55 and guide sleeve 48 are provided with complementary shoulders as at 58 and, in the assembly, the undersurface of portion 55 is spaced above the upper surface of boss 41 so that an annularly ribbed shoulder 59 on the sleeve may be forced tightly against boss 41 by the bolts. A post 60 projects upwardly from base portion 55 and, at its upper extremity, has diverging arms 61 and 62 provided with apertured bosses 63 and 64 for receiving the adjustable screws 65 and 66 to be referred to hereafter, and apertured bosses 67 and 68 for slidably receiving outlet valve stems 69 and 70. Stems 69 and 70, in their lower portions, are enlarged and hollowed to interiorly receive in close sliding engagement vertical tubes 71 and 72, respectively, pressed into outlet bosses 42 and 43. The stems are vented, as at 73.

Figure 4:
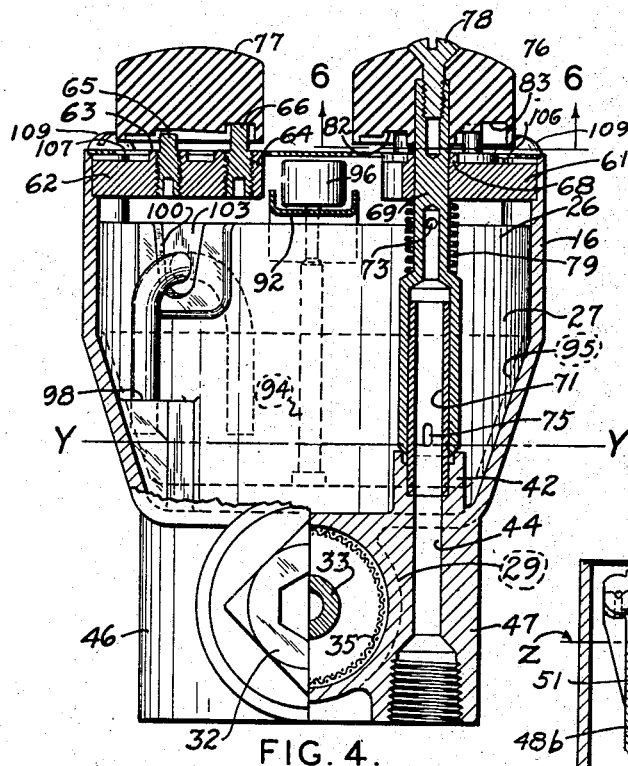
Figs. 4 and 5 are substantially vertical transverse sections taken substantially on the corresponding section lines of Fig. 2.

Tubes 71 and 72 are provided with suitably shaped metering orifices as at 75 (Fig. 4). Knurled manual adjustment knobs 76 and 77 are secured to the upper extremities of outlet valve stems 69 and 70 by means of cap screws 78. Valve stems 69 and 70 are constantly urged downwardly by means of coiled springs 79 and 80 compressed between the under surfaces of diverging arms 61 and 62 and the enlarged lower portions of the valve stems.

Figure 6:
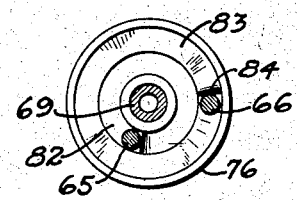
Fig. 6 is a detailed horizontal sectional view showing a part of the outlet valve control mechanism.
Figure 5:
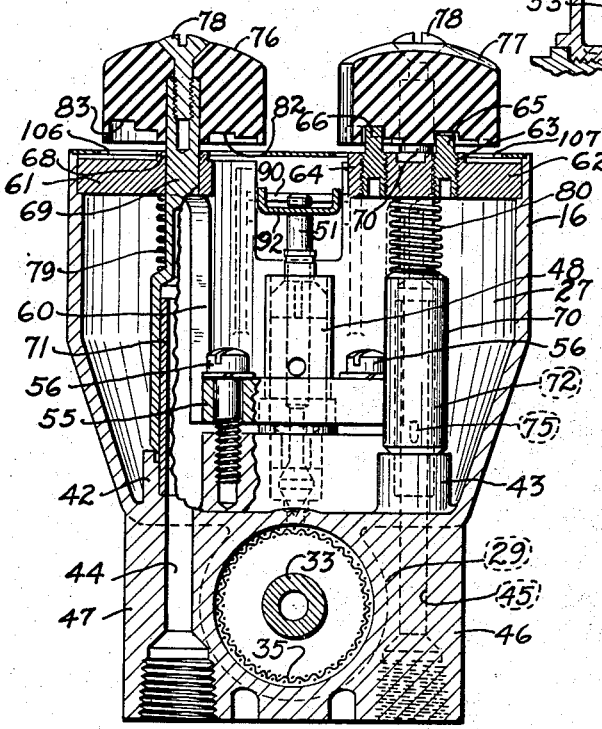

As shown most clearly in Figs. 4, 5 and 6, each manual control knob is provided on its under surface with a pair of annular cam surfaces 82 and 83 which cooperate, respectively, with the projecting upper ends of screws 65 and 66 for controlling the adjustment of the outlet valves. Cam surface 82 slopes more gradually than surface 83 and these cam surfaces and screws 65 and 66 are arranged so that during the first part of the clockwise rotation of each knob from its fully closed position, as shown in Figs. 4, 5 and 6, inner cam surface 82 rides upon the shorter screw 65 so as to provide for gradual opening of port 75 and accurate control of the slow fire or pilot feed. At a point during this rotation of the knob, the longer screws 66 comes into contact with outer cam surface 83 on the knob and valve stem 69 is thereafter raised at a more rapid rate. A sharp dip is provided at 84 at the end of the highest point in cam surface 83 so that after this point passes screw 66 the knob again drops onto the shorter screw 65 to close the valve. This prevents lifting of valve stem 69 beyond the full open position with relation to port 75. When the knob is fully rotated anti-clockwise so as to bring shorter screws 65 into engagement with the lowest point on cam surface 82, the lowered, tapered extremity of the valve stem will be firmly seated against the upper edge of boss 42 or 43.

In order to insure better seating of the outlet valve against this boss, the aperture therein is countersunk at its upper extremity.

A pin 90, extending between ears 91 on diverging arms 61 and 62, pivotally engages an arm 92 extending longitudinally of the casing near the upper portion thereof and over partition 26. This arm is provided with a keyhole slot 93 for receiving the annularly grooved upper extremity of inlet valve stem 51. At the outer extremity of arm 92, there is provided an aperture for slidably receiving a stem 94 rigid with and projecting upwardly from the center of frusto conical pan-like container 95 which closely corresponds, in its outer dimensions and shape, to the dimensions and shape of the lower part of auxiliary chamber 28. A knob 96 is secured to the upper extremity of stem 94 and a spring 97 is compressed between the undersurface of this knob and the upper surface of arm 92 for yieldingly supporting pan 95.

Figure 2:
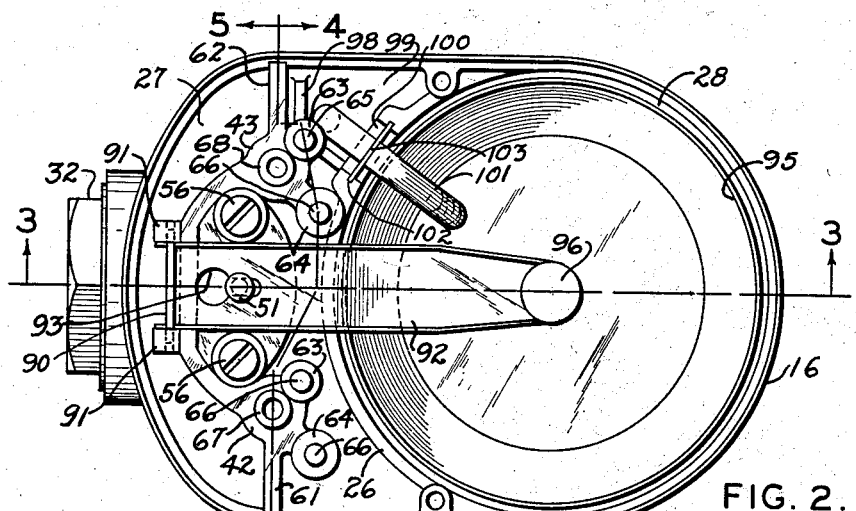
Fig. 2 is a top view of the novel control with the cover and other parts removed for clearer illustration.

As best shown in Figs. 2 and 4, a low wall 98 extends across one corner of main constant level chamber 27 and forms a well 99 therein. A siphon tube 101 extends upwardly from within well 99 through a recess 100 in partition 26 and downwardly into pan 95 and forms a hydraulic connection between the pan and main chamber. The side walls of recess 100 are grooved as at 102 for tightly receiving a thin collar 103 formed on the siphon tube so as to provide a substantially liquid tight fit therewith. This arrangement provides for easy assembly of the siphon tube in its proper position. The upper edge of low wall 98 is located slightly above the level of outlet port 75 so that the well cannot be drained through the port and the corresponding end of the siphon tube will be constantly submerged in liquid after the control has been placed in operation.

A cover 105 is provided with suitable openings 106, 107 and 108 for accommodating knobs 76, 77 and 96, respectively, and is secured to the casing by means of screws 109.

The control operates as follows:

When the casing is empty, as when first installed in an oil burner system, or when the liquid level in pan 95 is at or below the level V (Fig. 7) and chamber 28 is empty, springs 97 and 110 support arm 92 and the pan in their uppermost positions, as shown in Fig. 7, with valve 53 closed and knob 96 projecting substantially above casing cover 105 so as to be clearly visible. Preferably this knob will be painted bright red so as to contrast with the usual dark coloring of the casing and cover. If the control is then connected to piping leading from the oil tank and to the burner, as in Fig. 1, and knob 96 is manually depressed with its upper surface at the level of the casing cover, as shown in Fig. 8, double valve 52, 53 will be moved to an intermediate, open position between the valve seats formed on the upper edge of port 40 and the lower edge of sleeve 48 so that oil may flow inwardly through tube 33 thence upwardly through screen 35, port 40, boss 41, sleeve 48, and openings 48a into main constant level chamber 27.

When the oil in chamber 27 reaches approximately the level Z (Fig. 8), it will flow through siphon tube 101 into pan 95. Spring 110 is calibrated to yield when oil in pan 95 reaches the level T to permit lowering of the pan, arm 92 and valve stem 51 and closing of valve 52 against port 40. After the outlet valve is opened, oil in the main constant level chamber and pan will become equalized approximately to the level T—T (Fig. 3). Under normal operating conditions, spring 97 on the pan stem 94 is strong enough to support the weight of the pan and contents of the pan and arm 92 will rise and fall under the influence of the weight of liquid therein and spring 110, opening and closing valve 52 to maintain the level T—T in chamber 27.

During normal operation, the level T in the pan remains sensitively constant with respect to the floor of the casing, due to balancing of the pan by spring 110, which spring is accurately calibrated for this purpose. In fact, the absolute level of liquid in the pan will vary substantially less than does the level in the usual float controlled constant level chamber in which an increased demand or decreased supply head necessarily results in lowering of the supply level in the float chamber to permit further opening of the inlet valve. Where the normal head available in the constant level chamber is on the order of ½", as is the usual case with this type of device, a variation in level of even $\frac{1}{16}$" results in a material change in the rate of fuel supplied to the burner. I have found that fuel control devices of the present type having a level controlling float, as now in general use, produce a variation as high as 20%, for a given setting of the outlet valve, as the main fuel tank is drained. Pan 95, being frusto-conical, has straight sides, and these slope sharply or, in other words, approach vertical so that changes in volume of liquid in the pan are nearly directly proportional to corresponding changes in depth of the contained liquid. Since the distortion of a spring is, according to Hooke's Law, directly proportional to the stress, such shaping of the pan facilitates designing of spring 110 so that the absolute level of liquid in the pan remains very nearly constant. This is aided, further, by the small movement of valve member 52, 53 and the consequent small, though magnified, movement of the pan during normal operation. In the illustrated embodiment, valve 52, 53 moves about $\frac{1}{16}$ of an inch, and the corresponding movement of the pan during normal operation is about ½ of an inch or less than ½ the total depth of the pan.

If, for any reason, oil should continue to flow into the casing when pan 95 and valve 52 are lowered as in Fig. 3, the oil in the main constant level chamber and in pan 95 would then rise further so as to overflow the pan. When the overflow in chamber 28 reaches approximately the level U (Fig. 9) the weight of pan 95 and contents will be relieved due to the buoyancy of the overflow oil, permitting spring 110 to lift the pan and valve stem 51 so as to cause upper valve surface 53 to seat against the lower extremity of sleeve 48, closing the inlet passage. Thereafter, oil in the constant level chamber will drain through the outlet valve into the burner pan until the level Y (Fig. 7) is reached in the main chamber which corresponds approximately with the lower edge of metering port 75. At the same time oil will be drained from pan 95 through siphon tube 101 until the level in the main portion of chamber 27 is below the upper edge of well 99. In the fully drained position, as shown in Fig. 7, oil will remain in the pan 95 at the level V so as to submerge the corresponding end of the siphon tube. As the opposite end of the tube will remain submerged in oil in well 99, the siphon tube will remain full of oil ready for resetting of the mechanism without first driving air therefrom.

In order to re-set the control after the safety shut-off and draining, as described above, knob 96 on pan stem 94 is depressed as far as possible by the insertion of an instrument 112 through opening 108 so as to compress spring 97 and lower pan 95 against the bottom of auxiliary chamber 28 causing substantially all of the oil in the auxiliary chamber to be raised over the upper edge of the pan and returned thereto. The capacity of the pan is arranged so that the overflow oil will rise to the level X therein, which is slightly lower relative to the bottom of the pan, than the level T (Fig. 3). When instrument 112 is then removed, springs 97 and 110 will expand so as to return valves 52, 53 to an intermediate position between port 40 and the lower edge of sleeve 48 and raise the pan. Oil will again flow through port 40 to the levels T in both the main chamber and pan, as in Fig. 3. However, if valve 53 should seat when tool 112 is removed after return of the overflowed oil to the pan, knobs 96 will be visible, as in Figs. 7 and 9, and the control may be restarted, as in Fig. 8. If the capacities of the pan and auxiliary chamber and the weight of pan 95, arm 92, and stem 51 are accurately adjusted relative to the strength of spring 110, this will not be necessary. The overflow level U (Fig. 9) is close to the edge of the pan and the clearance between the pan and wall of chamber 28 is small so as to insure rapid spilling of the overflow oil into the pan when knob 96 is depressed and thus prevent the entry of air into the siphon tube.

In case of puncturing of the pan, upper valve 53, of course, will be firmly forced against its seat by spring 110. This spring is preferably made of such rugged proportions as to practically eliminate the possibility of failure thereof. Also, when the device is empty before being set into operation, or because of a leak in the system, spring 110 will hold valve 53 in its safety, closed position. This is especially important since it prevents the supplying of fuel to the burner, for instance during filling of the main tank, until the level control is manually set, as in Fig. 8.

The form in Fig. 11 functions similarly to the first form, but differs structurally in that liquid entering port 40 passes upwardly through valve guide sleeve 48b and thence through tube 115 into pan 95. In order to prime or start the control, liquid is poured into main chamber 37 to the level Z so as to fill siphon tube 101, but thereafter the valves are actuated automatically, both under normal and abnormal conditions, and, after the safety cut off the mechanism may be reset by fully depressing button 96, as previously described.

The control is substantially more simple and compact than similar devices now known and provides for effective control of the normal fuel level in the constant level chamber as well as a sure safety cut off. The downwardly facing valve seat on sleeve 48 being constantly washed by the oil will remain free of impurities and sediment which may enter the valve chamber. The exclusive use of all modifications as come within the scope of the appended claims is contemplated.

I claim:

1. In a liquid supply control, a main chamber member, an auxiliary chamber, a pan member in said auxiliary chamber, an hydraulic connection between said members, means for feeding liquid to one of said members comprising an inlet passage and valve means therefor, and valve actuating mechanism including an operative connection between said valve means and said pan member, said mechanism functioning to close said inlet passage responsive to the weight of liquid in said pan member and also responsive to the buoyancy of the liquid overflowed into said auxiliary chamber, upon said pan member.

2. In a liquid supply control, a main chamber and an auxiliary chamber, an outlet port in said main chamber, a pan in said auxiliary chamber, a duct connecting said main chamber and said pan, means for supplying liquid to said main chamber and said pan including a passage, valve means in said passage, means normally urging said valve means to close said passage, and an operative connection between said pan and said valve means, said valve closing means and said connection being responsive to the weight of a predetermined quantity of liquid in said pan to urge said valve means closed and to the weight of a lesser quantity of liquid in said pan to open said valve means, said valve closing means and said connection also functioning to close said valve means when the weight of said pan and the said pan in liquid therein is relieved due to buoyancy of liquid overflowed from said pan into said auxiliary chamber.

3. In a liquid supply control, a main constant level chamber member having an outlet port, an auxiliary chamber, a pan member in said auxiliary chamber adapted to overflow thereinto, a duct disposed to transmit liquid between said main chamber member and said pan member under operating conditions, a passage for supplying liquid to one of said members, valve means in said passage, a spring normally urging said valve means toward a first position to close said passage, and a connection between said valve means and said pan member for opening said valve means when the weight of said pan member and liquid contents substantially balances said spring, said connection being responsive to a greater weight of liquid in said pan member to distort said spring and urge said valve means to a second position to close said passage.

4. In a liquid supply control, a main constant level chamber having inlet and outlet passages, a valve device in said inlet passage, an auxiliary chamber, a duct hydraulically connecting said pan and said chamber, a pan in said auxiliary chamber, mechanism responsive to the weight of a predetermined quantity of liquid in said pan to move said valve device to a closed position and to a lesser weight of liquid in said pan to open said valve, and a spring normally urging said valve device away from said position and functioning to move said device to a second closed position when said weight is relieved by the buoyancy of said pan in liquid overflowed into said auxiliary chamber upon said pan.

5. In a liquid supply control, a main constant level chamber, an auxiliary chamber, a pan closely fitting but vertically movable in said chamber, a common source of liquid supply for said main chamber and said pan having a valve seat therein, a valve device for said seat, an operative connection between said pan and said valve device, and means to automatically drain liquid from said pan when said valve means is closed, said pan and said operative connection being responsive to the weight of a predetermined quantity of liquid in said pan to actuate said valve device and maintain a constant level in said main chamber and to close said valve device when liquid in said pan overflows into said auxiliary chamber, and said pan being manually depressible to expel liquid from said auxiliary chamber back into said pan after said pan has been drained.

6. In a liquid supply control, a casing having a partition forming main and auxiliary chambers, an inlet and an outlet in said main chamber, a valve device in said inlet, a pan movably carried in said auxiliary chamber, a siphon tube mounted independently of said pan and extending from a point inside said pan, and substantially below the top thereof, over the edge of said pan and through said partition and thence into said main chamber, and an operative connection between said pan and said valve device for closing said valve device when a predetermined quantity of liquid is collected in said pan to maintain a constant level in said main chamber above the level of the extremities of said tube.

7. In a liquid supply control, a main chamber member having an outlet, a vertically movable pan member, means for supplying liquid to both of said members including a passage opening into one of said members and a siphon tube supported independently of said pan member and extending from the interior of said last-mentioned member through the wall thereof above the liquid level therein and thence into the other member, and mechanism for controlling said valve device responsive to the weight of liquid in said pan to maintain a constant level of liquid in said main chamber member.

8. A control as specified in claim 7 further including a well in said main chamber member and extending above the level of said outlet, the adjacent end of said siphon tube being normally immersed in liquid in said well whereby air is prevented from entering said tube.

9. In a liquid supply control, a casing having a partition forming main and auxiliary chambers, said main chamber having an inlet and an outlet, a pan movable in said auxiliary chamber, a spring resiliently supporting said pan, a stationary tube extending through said partition and into the lower portion of said pan and main chamber, a valve device in said inlet, and an operative connection between said pan and said valve device to operate the latter responsive to the weight of liquid in said pan and maintain liquid in said main chamber at a constant level above the opening of said tube thereinto, said tube being wholly below the upper edge of said partition whereby liquid may flow through said tube in starting the control without overflowing from said main chamber into said auxiliary chamber.

10. In a liquid supply control, a casing having an outlet port, a floatable container in said casing, means yieldingly supporting said container, means to concurrently supply liquid to both said casing and said container including an inlet passage, valve means in said passage, and mechanism operatively connected to said valve means and arranged to operate said valve means responsive to the weight of said container and liquid contents to maintain a substantially constant level in said casing and responsive to the buoyancy of a predetermined excess of liquid in said casing to provide for emergency closing of said valve means.

11. In a liquid supply control, a casing including a main constant level chamber and an auxiliary chamber, a pan closely fitting and movable in said auxiliary chamber, means to supply liquid to said main chamber including a passage having a valve therein, means to control said valve during normal operation to maintain liquid in said main chamber at a substantially constant level, means to conduct liquid into said auxiliary chamber when the liquid in said main chamber reaches an abnormal level, said pan having an operative connection with said valve and being responsive to the presence of a predetermined quantity of liquid in said auxiliary chamber to close said valve, and an element projecting from said pan and substantially concealed by the casing wall when the control is functioning normally, said element being movable to an abnormal, clearly visible position beyond said wall when said valve is abnormally closed, as described, said element being manually movable from said protruded position to depress said pan and to transfer liquid from said auxiliary chamber thereto, and means to drain said pan.

12. In a liquid control, a casing having a partition forming main and auxiliary chambers, said main chamber having an outlet, a movable pan in said auxiliary chamber, a passage for supplying liquid to said main chamber and said pan, an hydraulic connection between said main chamber and said pan for maintaining liquid at related levels therein, valve means in said passage, and an operative connection between said pan and said valve means for maintaining a constant level of liquid in said main chamber according to the weight of liquid in said pan, said hydraulic connection being supported solely by said casing and independently of said pan whereby said pan may operate without mechanical restraint due to said connection.

13. In a liquid supply control, a casing having main and auxiliary chambers, a pan in said auxiliary chamber, a passage to supply liquid to said main chamber and said pan, a valve in said passage, and operative mechanism between said pan and said valve functioning to actuate said valve normally responsive to the weight of liquid in said pan to maintain a constant level of liquid in said main chamber, said mechanism functioning abnormally in accordance with the buoyancy of liquid in said auxiliary chamber to close said valve when said pan overflows.

GEORGE E. SELDON.